US006817499B2

(12) United States Patent
Martinez

(10) Patent No.: US 6,817,499 B2
(45) Date of Patent: Nov. 16, 2004

(54) HOLDER FOR A FOLDING TOOL

(75) Inventor: Michael A. Martinez, Albuquerque, NM (US)

(73) Assignee: The Group Design, Inc., Albuquerque, NM (US)

(*) Notice: Subject to any disclaimer, the term of this patent is extended or adjusted under 35 U.S.C. 154(b) by 120 days.

(21) Appl. No.: 10/327,720

(22) Filed: Nov. 20, 2002

(65) Prior Publication Data

US 2003/0089750 A1 May 15, 2003

Related U.S. Application Data

(63) Continuation-in-part of application No. 09/838,448, filed on Apr. 19, 2001, now abandoned.

(51) Int. Cl.$^{7}$ .............................................. B62B 29/02

(52) U.S. Cl. ....................... 224/197; 224/232; 224/269; 224/667

(58) Field of Search ................................ 224/197, 232, 224/666, 667, 668, 679, 269

(56) References Cited

U.S. PATENT DOCUMENTS 4,426,779 A * 1/1984 Morgan ....................... 30/138
4,485,946 A * 12/1984 Liautaud et al. ............ 224/242
4,494,309 A * 1/1985 Gray ........................... 30/151
4,494,310 A * 1/1985 Slaughter ..................... 30/155
4,525,928 A * 7/1985 Foster ......................... 30/158
4,561,577 A * 12/1985 Moore ........................ 224/232
4,718,586 A * 1/1988 Hagino ....................... 224/666
4,848,000 A * 7/1989 O'Dell ........................ 30/158
4,909,424 A * 3/1990 Reynolds .................... 224/232
D314,277 S * 2/1991 Hackley ...................... D3/221
5,054,170 A * 10/1991 Otrusina .................. 24/580.11
5,511,311 A * 4/1996 Collins ........................ 30/162
5,699,943 A * 12/1997 Schaefer et al. ............ 224/197
5,829,144 A * 11/1998 Dilworth et al. .............. 30/158
5,833,100 A * 11/1998 Kim ........................... 224/197
5,850,954 A * 12/1998 Dong-Joo ................... 224/197
5,878,500 A * 3/1999 Emerson ...................... 30/158
6,015,077 A * 1/2000 Disher ........................ 224/686
6,213,363 B1 * 4/2001 Norberg ..................... 224/270
6,283,348 B1 * 9/2001 Wang ......................... 224/271

* cited by examiner

*Primary Examiner*—Stephen K. Cronin
(74) *Attorney, Agent, or Firm*—Ray R. Regan

(57) ABSTRACT

A sheath for a folding tool such as a folding knife that is variably positionable during use. A variably positionable knife, according to the present invention, includes a sheath formed with a cavity. At least one rail is formed in the cavity. A chamber juxtaposed to the cavity also is formed in the sheath. The chamber is substantially hollow, and is formed to allow removable insertion of a locking tongue. The locking tongue includes a dome segment that applies pressure on the rail. A disk is included. The disk is rotatably mountable on the sheath, and includes a plurality of pegs. A hole is formed in for insertion of a connector. A groove is formed in the disk. In addition, the sheath includes a plug formed with a slot. An elastic o-ring is placed in both the groove and slot. The sheath also includes a block formed with a plurality of apertures in which the pegs are positionable. A band is engaged with the block for securing the sheath on a user.

40 Claims, 7 Drawing Sheets

HOLDER FOR A FOLDING TOOL

CROSS-REFERENCE TO RELATED APPLICATION

As provided in 35 U.S.C. §§119 and 120, Applicant claims priority to this nonprovisional patent application based on the copending nonprovisional U.S. patent application of Applicant, the inventor named in this application, filed in the United States Patent and Trademark Office on Apr. 19, 2001 continuation-in-part, Application Ser. No. 09/838,448, now abandoned.

FIELD OF THE INVENTION

The present invention pertains generally to a holder for a folding tool. More particularly, the new and useful invention claimed in this document pertains to a variably positionable sheath for removable of a folding knife from, and insertion of a folding knife into, the sheath using only one hand. The present invention is particularly, but not exclusively, useful for allowing the sheath to return to a zero position after a folding knife has been removed from or reinserted into the sheath.

BACKGROUND OF THE INVENTION

Beginning in the 18$^{th}$ century, technological advancements in forging metals that could hold sharp edges when formed into knife blades inaugurated significant alteration of the design, manufacture, and use of knives. What had been primitive tools started to become diverse, formidable, and even elegant implements. In recent decades, advancements in knife manufacturing technology has accelerated. Numerous companies and individuals now are devoted exclusively to design and manufacture of a wide variety of knives for work, sport, and collecting.

In the 21$^{st}$ century, many blades are manufactured from stainless steel, particularly martensitic stainless steels. Most blades include a wide variety of chromium that imparts corrosion resistance, and carbon, that provides hardening of a knife blade by heat treatment. Edge retention of knife blades has increased with the formulation of higher carbon content; corrosion resistance has increased by the use of higher chromium content.

The degree to which knife blades are treated for edge retention, corrosion resistance, and hardening depends at least in part on the uses for a particular knife. Modern knives have a variety of distinctive uses. The blade of a knife is the major determining factor in the work to which a knife and knife blade may be applied. The blade also is the chief concern in connection with safety in using a knife. Cost of a knife is a function, then, of the quality of the blade steel, workmanship, material used in forming a handle for the knife, and ornamentation. A knife blade generally is forged from steel into a desired shape, hardened and tempered, ground to a cutting edge and to remove all traces of forging and heat treatment, polished, and fitted to a handle. A wide variety of materials is used for handles, including horns and tusks, various woods, bone, and now an array of synthetic materials.

A major factor, if not the threshold factor, in the choice of a knife is between a fixed-blade or a folding knife. Folding knives, also called "folders," usually are selected on the basis of the intended use and user preference. Folding knives include both a blade and a handle. The blade includes a tip, two sides, a back or back spine, and at least one cutting edge. The handle includes a hollow inner channel or trough formed between opposing sides of a folding knife handle that generally is dimensioned to house all or a portion of a folded blade when not in use (in this document, the "handle gap"). Folding knives tend to be lightweight, versatile, and easily carried. When open, blades of folding knives may be locked in an operative position as a result of a variety of locking mechanisms. Releases for the locking mechanisms on folding knives generally are located on the handle to hold the knife open or closed, and include springs, tabs, or notches, or a combination of all mechanisms. In other words, most knife designers and manufacturers have focused on the knife and knife handle, rather than on a carrier such as a sheath, to control storage, use and deployment of a knife blade using a single hand.

Most such designs and apparatus for opening, locking, and releasing a folding tool, such as a folding knife, have proven to be expensive, unsafe, and mechanically unreliable. In addition, the user of a folding knife purportedly designed for use with only one hand may actually rely on internal mechanisms in the knife to provide single-handed control and use of the knife, which is inherently unsafe. In addition, the user of such a knife may be required to use two hands, rather than one, to open and close the blade due to the complexity of such mechanisms.

Safety is a considerable argument in favor of folding knives among those who use knives. Because of current designs, a user may have to locate a user's fingers in the arc path of a blade folded into place in a handle gap. A folding knife is inherently safer than an open knife. Besides being difficult to close, however, folders may open or close unexpectedly, especially if the spring, tab, or notch mechanism is over-stressed.

Considerable effort also has been devoted to design and manufacture of handles associated with knives. Many design alternatives for handles have been suggested. Some of those designs have attempted to include in handles of a folding knife one or more mechanisms for opening and closing a blade in relation to the handle. Most current solutions, however, require the use of two hands rather than one.

Perhaps because makers and manufacturers of knives have tended to focus on knife and handle design, rather than on sheath design, the knife industry as a whole seems to have concluded that solutions for single-handled draw of a folding knife, and restoration of a folding knife into a sheath, resides in the design of the knife itself. Little effort has been devoted to designing a sheath, and accompanying mechanisms associated with a sheath, to solve the problems associated with achieving single-handed removal of a knife from a sheath, reinsertion, and storage.

The limitations of the current state of the art become evident on using a knife, particularly a folding knife, and even more particularly if a user is attempting to use a knife using a one hand. As indicated, most mechanisms now associated with a folding knife are located in the knife or knife handle, requiring the use of two hands. None of the mechanisms for single-handed use is safe or durable. A further limitation of current apparatus is that no sheath is provided that assists a single-handed user in grasping, storing or holding the knife blade when not in use. An additional limitation is caused by the weakness of spring-loaded opening mechanisms on most conventional folding knives. Most spring-loaded opening mechanisms assist in opening a folding knife blade from a handle only a limited distance. Safety, obviously, is a major concern with the current state of the art.

Therefore, a previously unaddressed need exists in the industry for a new and useful variably positionable holder for a folding tool, such as a sheath for a folding knife, that permits a user to safely sheath, remove, use, and restore to a sheath a folding tool, such as a folding knife (collectively, "sheathing") with one hand.

SUMMARY OF THE INVENTION

Given the conventional solutions for solving the problem of single-handed sheathing, which includes inserting a folding tool such as a folding knife into a sheath, removing the folding tool from the sheath, and reinserting the folding tool to the sheath, it would be desirable, and of considerable advantage, to provide a holder, such as a positionable sheath, for a folding tool such as a folding knife that can safely and securely hold the folding tool when not in use, yet renders the folding tool instantly available for removal from the sheath with a single hand when the folding tool is needed for work.

The present invention provides numerous advantages in connection with solving problems currently associated with single-handed sheathing. At least one advantage of the present invention is that it provides a safe, secure, and reliable solution to the current problems in the industry.

Another significant advantage of the present invention is that it provides ambidextrous use. Most knives and sheaths are designed in contemplation of right-handed use. The present invention includes structural elements that cooperate with a folding tool to enable either a right-handed or left-handed person to operate the invention without modification or special location of the invention.

In addition, structural elements are provided with the present invention that, contrary to current sheaths, allow use of the invention by users of knives having heavier than usual blades and handles, regardless of the shape of the knife blade or handle.

Another advantage of the present invention is that it renders irrelevant spring mechanisms and similar unsafe and unreliable closing mechanisms previously included with folding knives in an effort to achieve single-handed sheathing.

Yet another advantage of the positionable holder for a folding tool, in accordance with the present invention, is that it relies primarily on the sheath, rather than on the knife itself, to achieve the objects of the present invention. Because the sheath is rotatable by the user into many different positions, yet always returns to zero position, the user of the knife may position the sheath for a customized draw and reinsertion of the knife into the sheath.

Another advantage of the present invention is its ability to accommodate a wide variety of knife shapes and designs because of the configuration of the carrier, or sheath, included in the apparatus.

Still another advantage of the present invention is the ability to select a multiplicity of drawing positions that accommodate ergonomically the differing hand sizes, arm lengths, and similar physiological differences among users.

Yet another advantage of the present invention is its resistance to water and sunlight corrosion, while remaining comparatively affordable.

Still another advantage of the present invention is the ability to secure a folding knife in the apparatus pending the need to use the folding knife, while also providing a mechanism for quick, single finger release of the mechanism when needed.

These and other advantages of the present invention are achieved by providing a sheath for a folding tool, such as a folding knife, that includes a cavity. One or more rails is formed in the cavity. A chamber also is formed in the sheath adjacent the cavity. A tongue is provided that is removably insertable in the chamber. The tongue is formed with a dome segment on the upper surface of the tongue for applying pressure against a rail in the cavity of the sheath. Also provided are means for variably positioning the sheath during use by a user. The variably positioning means includes a disk. The disk is rotatably mounted on the sheath, and includes a plurality of pegs extending from one side of the disk. The disk also includes a hole formed substantially in the middle of the disk for insertion of a connector. In addition, at least one groove is formed on one side of the disk, and extends through the wall of the disk. A plug is formed at the distal end of the sheath, and a slot is formed in the plug. An o-ring is provided that is positionable on assembly of the sheath in both the groove of the disk, and the slot of the plug. The present invention also includes means for securing the sheath to a user during use of the invention. The securing means includes a block formed with a plurality of apertures in one plate of the block for slidable engagement with the pegs formed on the disk. In addition, the securing means also includes a clamp, band, or lap-over band, one end of which is engagable with the block, the other end of which may be attached to the user of the present invention.

Thus, it is clear from the foregoing that the claimed subject matter as a whole, including the structure of the apparatus, and the cooperation of the elements of the apparatus, combine to result in a number of unexpected advantages and utilities of the present invention. The advantages and other objects of the present invention, and features of such a holder for a folding tool will become apparent to those skilled in the art when read in conjunction with the accompanying following description, drawing figures, and appended claims The foregoing has outlined broadly the more important features of the invention to better understand the detailed description which follows, and to better understand the contribution of the present invention to the art. Before explaining at least one embodiment of the invention in detail, it is to be understood that the invention is not limited in application to the details of construction, and to the arrangements of the components, provided in the following description and drawing figures. The invention is capable of other embodiments, and of being practiced and carried out in various ways. Also, the phraseology and terminology employed in this disclosure are for purpose of description, and should not be regarded as limiting.

As those skilled in the art will appreciate, the conception on which this disclosure is based may be used as a basis for designing other structures, methods, and systems for carrying out the purposes of the present invention. The claims, therefore, include such equivalent constructions to the extent the equivalent constructions do not depart from the spirit and scope of the present invention. Further, the abstract associated with this disclosure is neither intended to define the invention, which is measured by the claims, nor intended to be limiting as to the scope of the invention in any way.

The novel features of this invention, and the invention itself, both as to structure and operation, are best understood from the accompanying drawing, considered in connection with the accompanying description of the drawing, in which similar reference characters refer to similar parts, and in which:

DESCRIPTION OF THE PREFERRED EMBODIMENT

Briefly, the present invention provides an apparatus and a method for manufacturing a variable positionable sheath for a folding knife that includes a sheath for a folding tool, such as a folding knife, that includes a cavity. One or more rails is formed in the cavity. A chamber also is formed in the sheath adjacent the cavity. A tongue is provided that is removably insertable in the chamber. The tongue is formed with a dome segment on the upper surface of the tongue for applying pressure against a rail in the cavity of the sheath. Also provided are means for variably positioning the sheath during use by a user. The variably positioning means includes a disk. The disk is rotatably mounted on the sheath, and includes a plurality of pegs extending from one side of the disk. The disk also includes a hole formed substantially in the middle of the disk for insertion of a connector. In addition, at least one groove is formed on one side of the disk, and extends through the wall of the disk. A plug is formed at the distal end of the sheath, and a slot is formed in the plug. An o-ring is provided that is positionable on assembly of the sheath in both the groove of the disk, and the slot of the plug. The present invention also includes means for securing the sheath to a user during use of the invention. The securing means includes a block formed with a plurality of apertures in one plate of the block for slidable engagement with the pegs formed on the disk. In addition, the securing means also includes a clamp, band, or lap-over band, one end of which is engagable with the block, the other end of which maybe attached to the user of the present invention by inserting the lap-over band over, for example, a belt. The present invention, therefore, is particularly, but not exclusively, useful for allowing the sheath to return to a zero position after a folding knife has been removed from or reinserted in the sheath.

Figure 1:
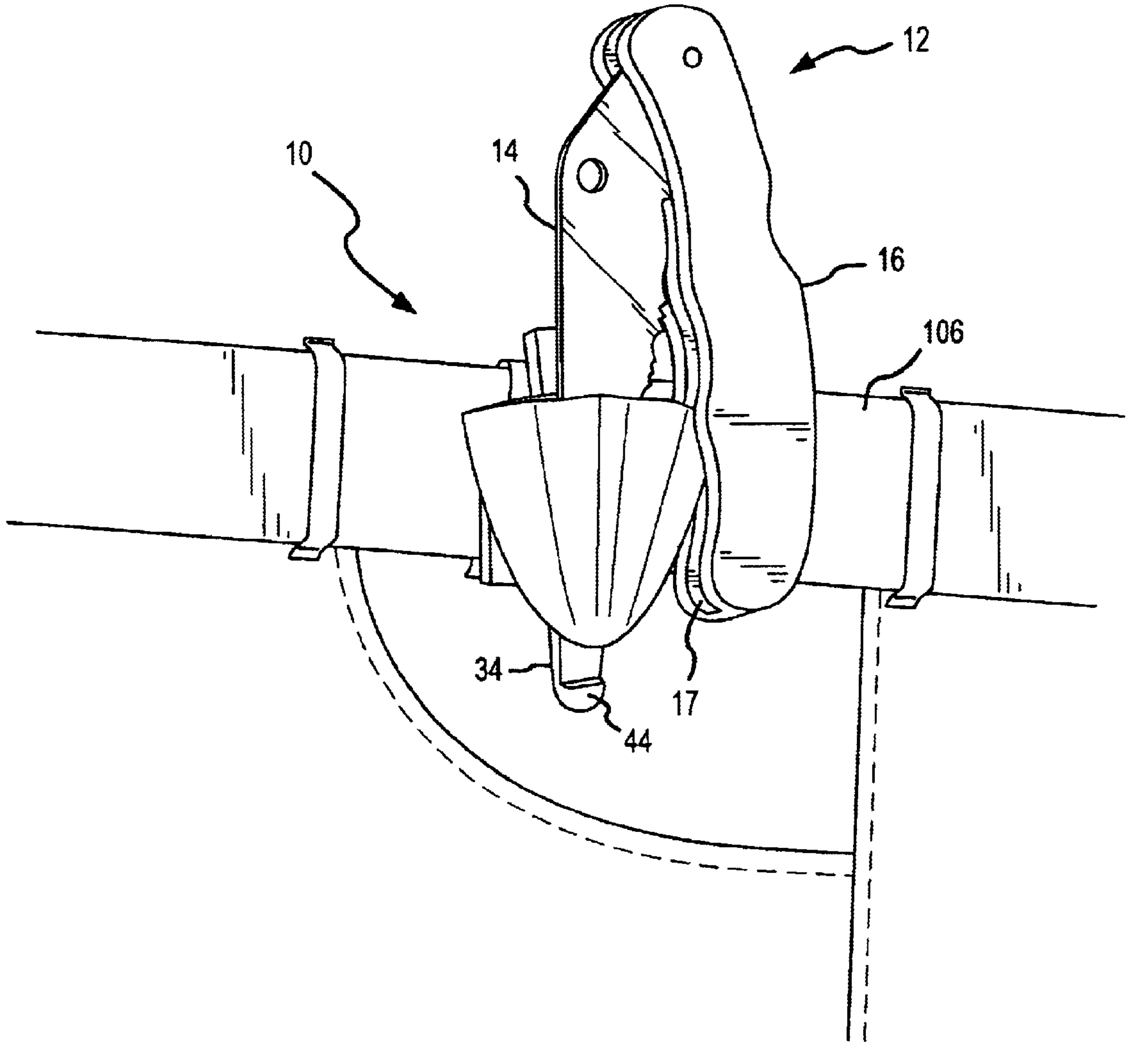
FIG. 1 is a perspective view of the variably positionable sheath for a folding knife, according to the present invention, in an operative environment, with a folding knife.

Specifically, FIG. 1 shows a holder for a folding tool, such as a variably positionable sheath 10 (also referred to as a “sheath”) for a folding knife 12 (also referred to as a “knife”) in an operative position on a user of sheath 10. Specifically, FIG. 1 shows folding knife 12 having a blade 14 and a handle 16.

Figure 2:
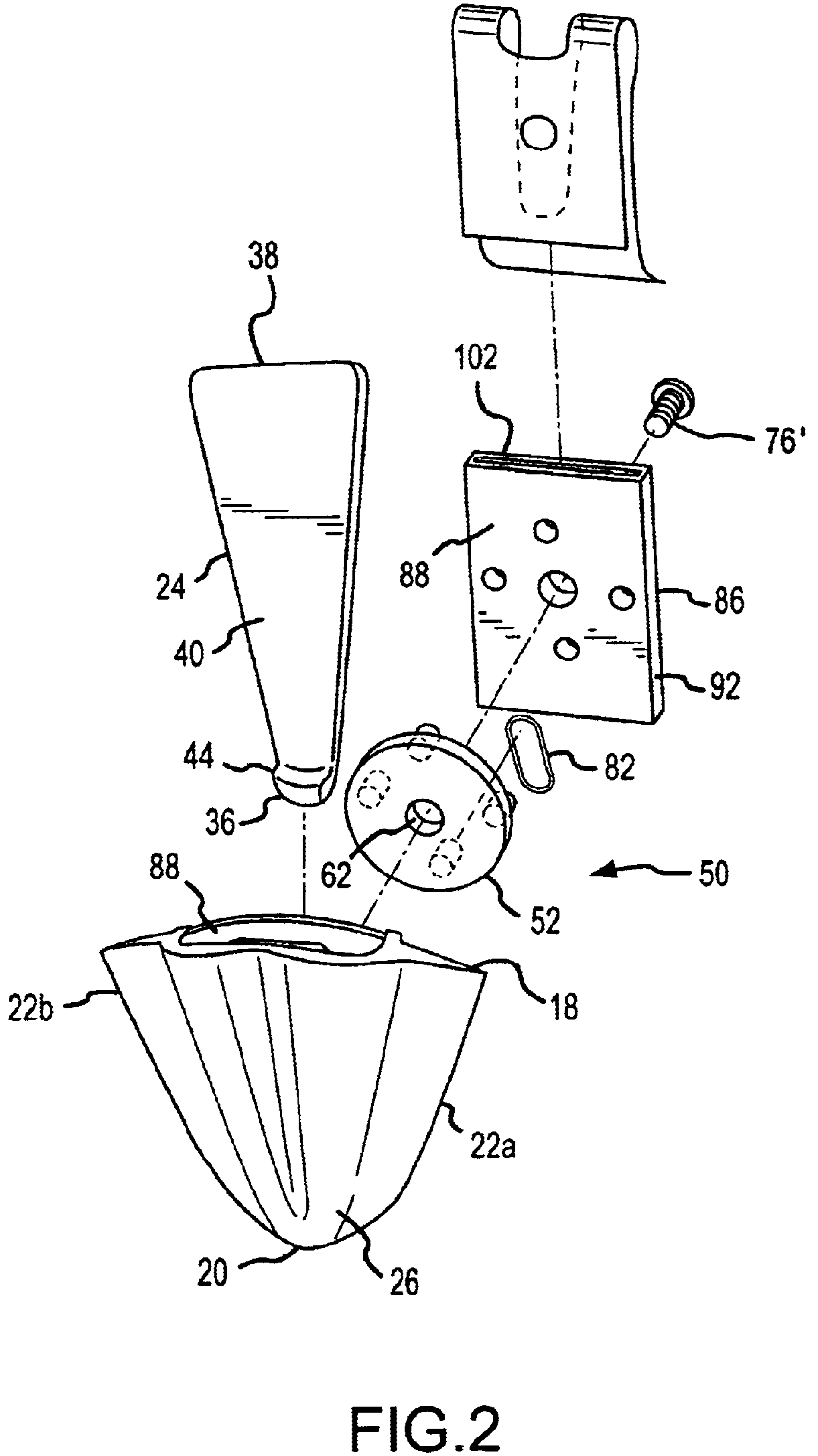
FIG. 2 is perspective unassembled view of the sheath, tongue, disk, block, lap-over band, o-ring, and a connector.
Figure 3:
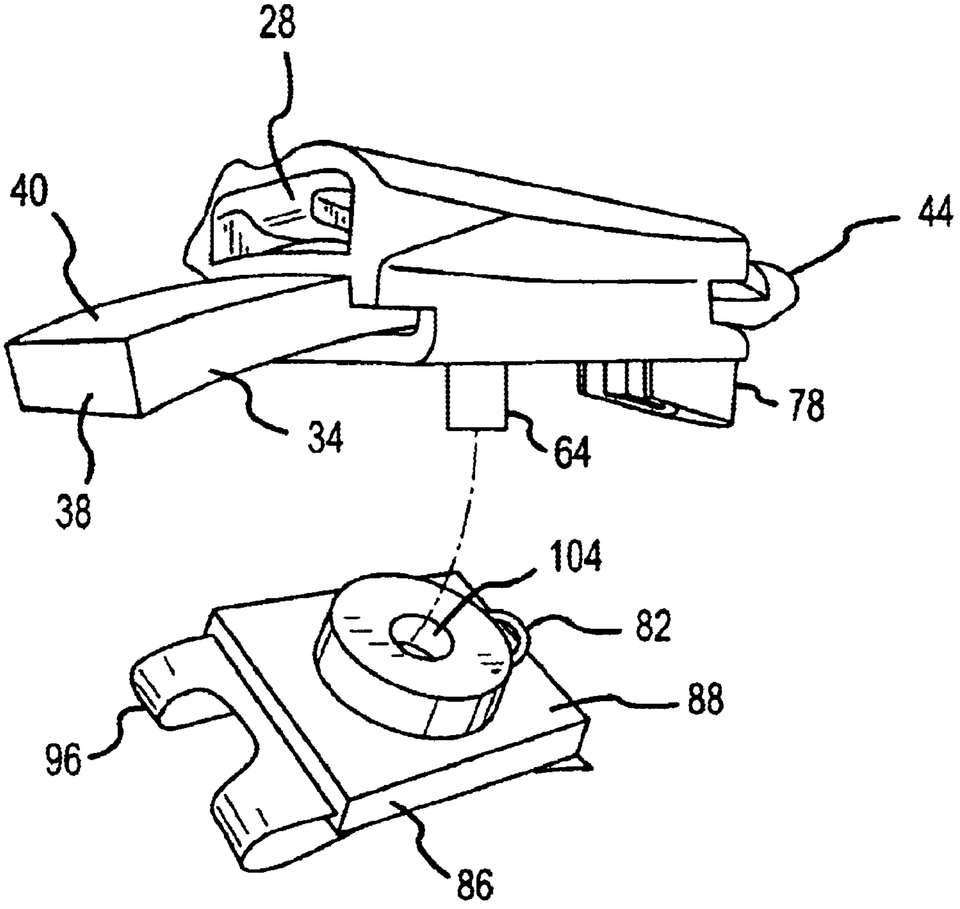
FIG. 3 is an exploded perspective end view of the sheath, with tongue inserted, and the disk, o-ring, block, and lap-over band.
Figure 4:
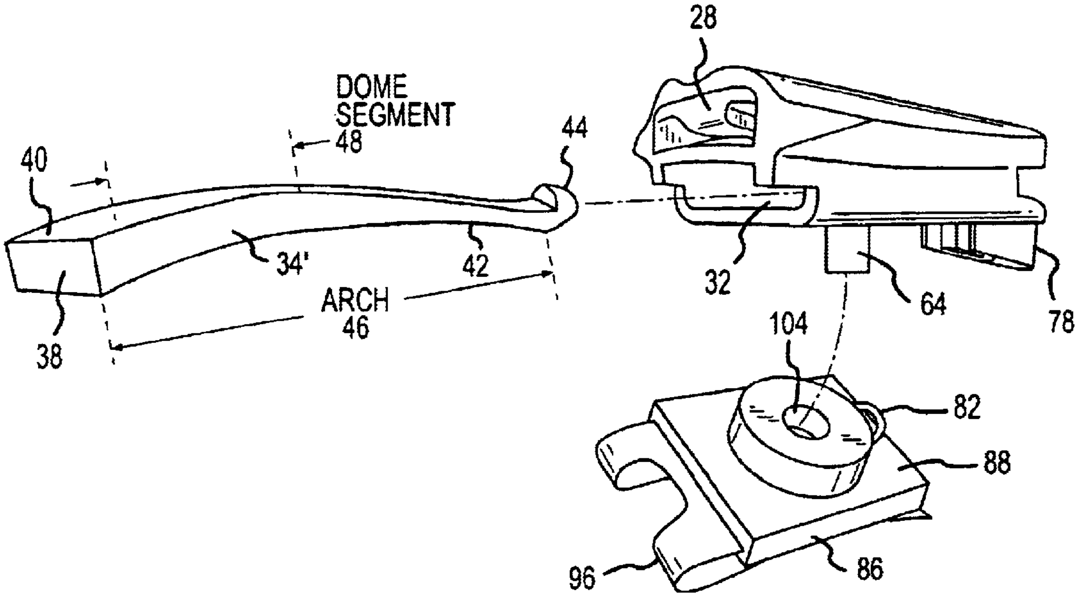
FIG. 4 is an exploded end view of the sheath, with tongue removed, and the lap-over band and block separated from the sheath.
Figure 5A:
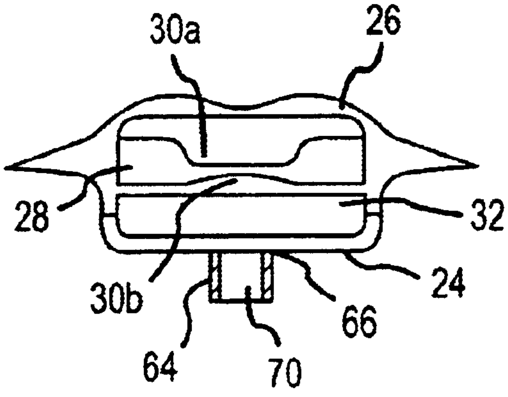
FIGS. 5A and 5B are opposite end views of the sheath with tongue removed.
Figure 5B:
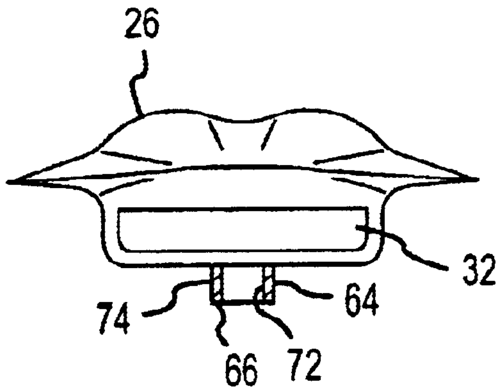

Referring to FIG. 2, sheath 10 of the present invention is shown to be formed with a proximal end 18, distal end 20, and opposing fins 22*a, b* extending substantially the length of sheath 10 between proximal end 18 and distal end 20. As also shown by cross-reference between FIGS. 2, 5A and 5B, sheath 10 is formed with an exterior surface 24 and an interior surface 26. As perhaps best shown in FIGS. 4, 5A and 5B, sheath 10 is formed with a cavity 28. At least one rail 30 is formed in cavity 28. In a preferred embodiment of the present invention, at least one rail 30 extends along a longitudinal axis through cavity 28 between proximal end 18 and distal end 20 of sheath 10. Also in a preferred embodiment of the present invention, as best shown by cross reference among FIGS. 4, 5A and 5B, a chamber 32 is formed in sheath 10. Chamber 10 is juxtaposed to cavity 28 in sheath 10. Also in a preferred embodiment of the present invention, chamber 32 is substantially hollow, and monolithically formed in sheath 10. Tongue 34 is also provided. In a preferred embodiment of the present invention as best shown by cross-reference among FIGS. 2–4, tongue 34 is a resilient bowed locking tongue 34. Tongue 34, in operation, is used as a locking mechanism as more fully set forth in this document below. Tongue 34 includes a leading end 36, a trailing end 38, an upper surface 40, and an under surface 42. Tongue 34 is formed with leading end 36. Leading end 36 tapers inwardly toward the longitudinal axis of tongue 34 between leading end 36 and trailing end 38 of tongue 34. In addition, a shoe 44 is formed in leading end 36 of tongue 34. As shown best in FIG. 4, an arch 46 is formed in tongue 34 between leading end 36 and trailing end 38. Arch 46 is shown diagrammatically in FIG. 4. As will be evident to one skilled in the art, the precise dimensions of arch 46 are not a limitation of the present invention. Arch 46 forms a dome segment 48 on upper surface 40 of tongue 34. As will be evident to one skilled in the art, the dimensions of dome segment 48 on upper surface 40 of tongue 34 are not a limitation on the present invention.

Figure 7A:
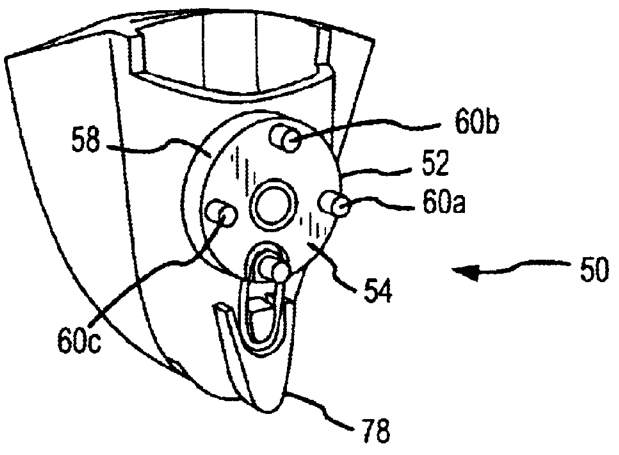
FIGS. 7A and 7B are perspective views of the sheath showing the o-ring mounted within the groove in the disk and the slot of the plug.
Figure 7B:
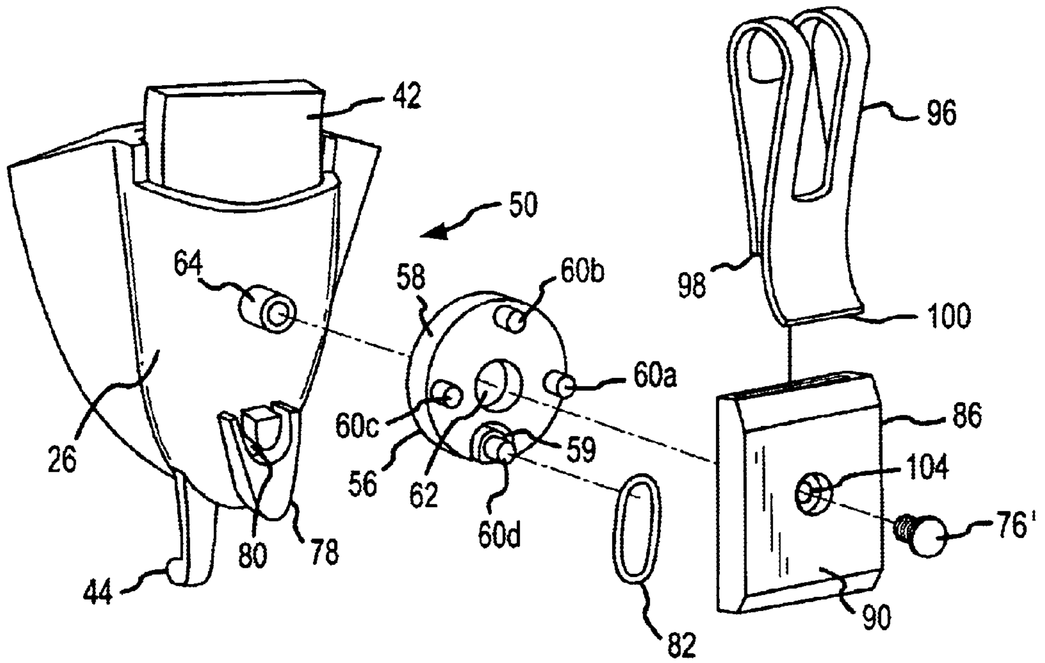

Referring to FIGS. 2, 7A and 7B, sheath 10 is shown to include means 50 for variably positioning sheath 10. As shown, means 50 for variably positioning sheath 10 during use includes a disk 52. Disk 52 is rotatably mountable on interior surface 26 of sheath 10. As shown, disk 52 is formed with an anterior side 34, a posterior side 56, and a wall 58 extending between anterior side 54 and posterior side 56. Disk 52 further includes a plurality of pegs 60*a*–*d* extending substantially at right angles from anterior side 54 of disk 52. In a preferred embodiment of the present invention, plurality of pegs 60*a*–*d* monolithically extend from anterior side 54 of disk 52. As will be evident to one skilled in the art, however, the monolithic extension of plurality of pegs 60*a*–*d* on disk 52 is not a limitation of the present invention.

As also shown, disk 52 further includes a hole 62 formed through disk 54 substantially in the middle of disk 52, and extending between anterior side 54 and posterior side 56 of disk 52. Hole 62 in disk 52 is provided for rotatable engagement with tube 64 monolithically extending from interior surface 24 of sheath 10. Disk 52 also is formed with a groove 59 as best shown in FIGS. 7A and 7B. In a preferred embodiment of the present invention, groove 59 is substantially semi-circular in configuration and extends through wall 58 of disk 52. In a preferred embodiment of the present invention, tube 64 is formed monolithically on the interior surface 24 of sheath 10 to have a first end 66, a second end 68, and a substantially cylindrical duct 70 being an inner surface 72 formed with threads 74. A connector 76 is provided. Connector 76 is selected from the group of connectors consisting of screws, nails, rivets, staples, nuts and bolts, preferably a threaded screw $\mathbf{76}^1$ but as will be evident to one skilled in the art, the choice of a connector is not a limitation on the present invention. Means 50 for variably positioning sheath 10 during use includes a plug 78. Plug 78 is formed at distal end 20 of sheath 10. In addition, plug 78 is further formed with a slot 80 as best shown in FIG. 7B. In a preferred embodiment of the present invention, slot 80 in plug 78 is substantially semi-circular in shape. Means 50 for variably positioning sheath 10 during use also includes at least one o-ring 82. In a preferred embodiment of the present invention, o-ring 82 is elastic. As used in this document the term "elastic" means that o-ring 82 is manufactured of synthetic rubber or similar material, is capable of recovering size and shape after deformation, is also capable of recovering quickly from expansion or retraction, is easily stretched or expanded, resumes its original or former shape, resists deformation by stretching, and may be bent twisted or folded without any perceptible sign of injury.

Figure 6:
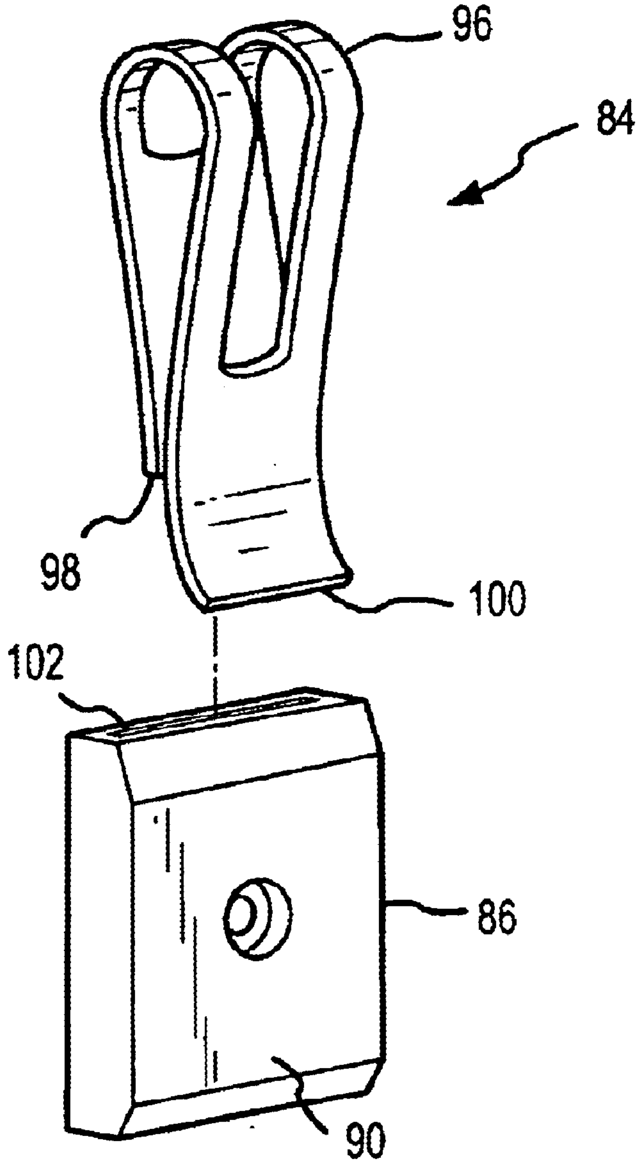
FIG. 6 is a perspective view of the block and lap-over band unassembled.

As perhaps best shown by cross-reference among FIGS. 2, 6 and 7B,, the present invention also includes means 84 for securing sheath 10 to a user. Means 84, in a preferred embodiment of the present invention, includes a block 86. Block 86 is formed with an inner plate 88, an outer plate 90, a border 92 between inner plate 88 and outer plate 90. A plurality of apertures 94 is formed in block 86 between inner plate 88 and outer plate 90. In a preferred embodiment of the present invention, plurality of apertures 94*a–d* is sized and shaped for slidable and removable engagement with pegs 60*a–d* extending from anterior side 54 of disk 52. Means 84 for securing sheath 10 to a user includes a lap-over band 96. Lap-over band 96 is formed with an exposed end 98 and an insertable end 100. In addition, a channel 102 is formed in block 86. Insertable end 100 of lap-over band 96 is inserted into channel 102 of block 86. Exposed end 98 may be secured, for example, on an article of clothing of a user, such as a belt 106 as shown in FIG. 1.

In a preferred embodiment of the present invention, sheath 10 and tongue 34 are manufactured preferably of a material such as an acrylic/PBC thermoplastic with high impact and abrasion resistance qualities. Preferably, the materials used to make the present invention would be impervious to most chemicals, solvents, petroleum based products, and moisture, including salt water. The material, when heated and manipulated, should retain its shape without shrinking or cracking, even under repeated stress. Preferably, such a material would be a synthetic resinous compound in the form of powders or pellets for use in the manufacture of molded parts. In addition, preferably the material would fire retardant. The material should not decay, rot, dry out or absorb moisture. Despite repeated use, material used in manufacturing the present invention should hold its shape so as to allow safe one-handed removal of a folding tool, such as a folding knife 12 from sheath 10, as well as re-holstering knife 12 in sheath 10. In a preferred embodiment of the present invention, sheath 10 and tongue 34 are manufactured of KYDEX, or CONCEALEX, both products of Kleerdex Company.

OPERATION

In operation, a variably positionable sheath 10 for a folding knife 12 solves significant problems in the industry by providing an apparatus for single-handed sheathing of a folding tool such as a folding knife 12. As will be evident by cross-reference among the various Figures, the present invention may be assembled by inserting insertable end 100 into channel 102 of lap-over band 96 before securing lap-over band 96 in block 86. Following insertion of insertable end 100 in block 86, exposed end 98 of lap-over band 96 is touching or is adjacent to outer plate 90 of block 86. Block 86 is formed with a bore 104 substantially through the center of block 86 as best shown in FIG. 2. A connector 76, preferably a threaded screw 76$^{1}$, may be inserted into and through bore 104 for threadable engagement with threads 74 formed in tube 64 monolithically and surroundingly formed adjacent hole 62 in disk 52.

A portion of o-ring 82 is positioned in groove 59 formed in disk 52, and a portion of o-ring 82 is positioned in slot 80 of plug 78 formed at distal end 20 of sheath 10. As a further step in assembly of the present invention, tongue 34, having been formed of a resilient material, is removably insertable into chamber 32. When inserted into chamber 32, shoe 44 formed in leading end 36 of tongue 34 may extend beyond distal end 20 of sheath 10.

Following assembly of the present invention, exposed end 98 of lap-over band 96 may be hooked behind a belt 106 of a user and is deployed for use. A folding knife 12 may be partially opened from handle 16, and blade 14 partially removed from handle gap 17 in handle 16, and blade 14 inserted into cavity 28 of sheath 10. In a preferred embodiment of the present invention, sheath 10 is formed and manufactured of a material such as KYDEX, and accordingly folding knives 12 having beak tips and serrated edges may be inserted indefinitely into cavity 28 of sheath 10 without causing damage to sheath 10 or to cavity 28. When inserted into sheath 10 as shown in FIG. 1, folding knife 12 and sheath 10 are in the zero position. The term "zero position" as used in this document means that sheath 10 is substantially vertical or coincident with a longitudinal axis through both sheath 10 and block 86 and a user. Tongue 34 may be used to further secure knife 12 in sheath 10. Trailing end 38 of tongue 34 may be depressed using as few as one finger. By depressing trailing end 38 of tongue 34 toward distal end 20 of sheath 10, dome segment 48 of upper surface 40 of tongue 34 applies pressure against rail 30 in cavity 28 of sheath 10, and rail 30 contributes to securing blade 14 of knife 12 in sheath 10. When a user elects to remove knife 12 from sheath 10, user may apply pressure against shoe 44 on leading end of tongue 34, using as few as one finger, or may pull trailing end 38 of tongue 34 in a direction opposite distal end 20 of sheath 10, thus, relieving or releasing pressure being applied against rails 30*a, b* by dome segment 48 of tongue 34, and folding knife 12 may be removed from sheath 10. As will be evident to one skilled in the art, use of the present invention is not limited to a right-handed person.

On grasping handle 16 of knife 12, no matter how aggressively, disk 52 rotates in a clock-wise or counter-clockwise direction around tube 64 on disk 52. O-ring 82 which, as indicated previously, is positioned in groove 59 of disk 52 and in slot 80 of plug 78, is distended in one or more directions. When folding knife 12 is removed from sheath 10, because o-ring 82 is flexible, sheath 10 rotates back to a zero position ready for reinsertion of blade 14 into cavity 28 of sheath 10.

While the apparatus and method for controlling use of a knife shown in drawing FIGS. 1 through 7B is one embodiment of the present invention, it is merely one embodiment of the invention, is not intended to be exclusive, and is not a limitation of the present invention. The particular apparatus and method for controlling use of a knife as shown and disclosed in detail in this instrument is fully capable of obtaining the objects and providing the advantages stated, but this disclosure is merely illustrative of the presently preferred embodiments of the invention, and no limitations are intended in connection with the details of construction, design or composition other than as provided and described in the appended claims.

What is claimed is:

1. A holder for a folding tool, comprising:

a sheath formed with a cavity,
wherein the cavity includes at least one rail;

a chamber juxtaposed to the cavity;

means for variably positioning the sheath during use; and means for securing the sheath to a user.

2. A holder for a folding tool as recited in claim 1, wherein the sheath is formed with a proximal end, a distal end, and opposing fins between the proximal end and distal end.

3. A holder for a folding tool as recited in claim 2, wherein the at least one rail extends along a longitudinal axis through the cavity between the proximal end and the distal end of the sheath.

4. A holder for a folding tool as recited in claim 1, wherein the chamber is substantially hollow and wherein the chamber is monolithically formed in the sheath.

5. A holder for a folding tool as recited in claim 4, further comprising a locking tongue removably insertable in the chamber.

6. A holder for a folding tool as recited in claim 1, wherein the securing means includes a block formed with an inner plate, and outer plate, a border between the inner plate and outer plate, and a plurality of apertures formed in the outer plate.

7. A holder for a folding tool as recited in claim 6, wherein the securing means further comprises a lap-over band engagable with the block for securing the holder on a user.

8. A holder for a folding tool as recited in claim 1, wherein the locking tongue includes a leading end, a trailing end, an upper surface, and an undersurface.

9. A holder for a folding tool as recited in claim 8, wherein the leading end tapers inwardly toward the longitudinal axis through the locking tongue to a shoe formed in the leading end.

10. A holder for a folding tool as recited in claim 9, wherein an arch is formed in the locking tongue between the leading end and the trailing end to form a dome segment on the upper surface.

11. A holder for a folding tool as recited in claim 1, wherein the variably positioning means includes a disk rotatably mountable on the sheath, and wherein the disk is formed with an anterior side, a posterior side, and a wall therebetween.

12. A holder for a folding tool as recited in claim 11, wherein the disk further comprises a plurality of pegs extending from the anterior side of the disk.

13. A holder for a folding tool as recited in claim 12, wherein the disk further comprises a hole formed substantially in the middle of the disk extending between the anterior side and the posterior side of the disk for insertion of a threaded screw.

14. A holder for a folding tool as recited in claim 13, wherein the disk further comprises at least one groove that extends through two points of the wall.

15. A holder for a folding tool as recited in claim 14, wherein the variably positioning means includes a plug formed at the distal end of the sheath.

16. A holder for a folding tool as recited in claim 15, wherein the plug is further formed with a slot.

17. A holder for a folding tool as recited in claim 16, further comprising at least one elastic O-ring demountably positionable in the groove and slot.

18. A variably positionable sheath for a folding knife, comprising:

a sheath, wherein the sheath is formed with opposing fins, an exterior surface, an interior surface, a proximal end, and a distal end;

a substantially hollow chamber formed monolithically in the sheath;

a resilient locking tongue removably insertable in the hollow chamber;

a rotatable disk mountable on the substantially hollow chamber, wherein the rotatable disk is formed with a groove;

a plug formed at the distal end of the interior surface of the sheath, wherein the plug further is formed with a slot;

an O-ring demountably positionable in the groove and the slot; and means for detachably securing the sheath to a user.

19. A variably positionable sheath for a folding knife as recited in claim 18, wherein the opposing fins are engagable with the folding knife.

20. A variably positionable sheath for a folding knife as recited in claim 18, wherein the sheath further comprises opposing rails within the sheath extending between the proximal end and the distal end of the sheath.

21. A variably positionable sheath for a folding knife as recited in claim 18, wherein the resilient locking tongue is formed with a dome segment for applying pressure against at least one of the opposing rails to hold the folding knife in the sheath.

22. A variably positionable sheath for a folding knife as recited in claim 18, wherein the rotatable disk further comprises one or more pegs monolithically protruding from the rotatable disk.

23. A variably positionable sheath for a folding knife as recited in claim 18, wherein the rotatable disk includes a groove.

24. A variably positionable sheath for a folding knife as recited in claim 18, wherein the detachably securing means includes a block having one or more apertures.

25. A variably positionable sheath for a folding knife as recited in claim 18, wherein the detachably securing means includes a clamp engagable with the block.

26. A system for sheathing a knife, comprising:

a sheath formed with a cavity, wherein the cavity further comprises opposing rails;

a device connectable to the sheath for variably positioning the sheath;

a chamber interposed between the cavity and the device;

a tongue removably insertable into the chamber; and means attachable to the sheath for securing the system during use.

27. A system for sheathing a knife as recited in claim 26, wherein the sheath further comprises one or more fins engagable with the knife.

28. A system for sheathing a knife as recited in claim 27, wherein the device includes a disk formed with an anterior side, a posterior side, and a wall between the anterior side and the posterior side.

29. A system for sheathing a knife as recited in claim 28, wherein the disk further comprises a plurality of pegs extending from the anterior side of the disk.

30. A system for sheathing a knife as recited in claim 29, wherein the disk further comprises a hole formed substantially in the middle of the disk and extending between the anterior side and the posterior side of the disk for insertion of a connector selected from the group of connectors consisting of screws, nails, rivets, staples, nuts and bolts.

31. A system for sheathing a knife as recited in claim 30, wherein the disk further comprises at least one groove.

32. A system for sheathing a knife as recited in claim 31, wherein a slot is formed in the sheath.

33. A system for sheathing a knife as recited in claim 32, wherein the device further comprises at least one substantially elastic O-ring demountably positionable in the groove and the slot.

34. A method for manufacturing a sheath for a folding knife, comprising:

providing a sheath;

shaping the sheath to include opposing fins;

forming monolithically a substantially hollow chamber in the sheath;

including a resilient bowed locking tongue for removable insertion in the hollow chamber;

configuring a disk for rotatable mounting on the sheath;

disposing on the sheath means for returning the sheath to a zero position; and furnishing means for securing the sheath on a user.

35. A method for manufacturing a sheath for a folding knife as recited in claim 34, wherein the substantially hollow chamber forming step includes the substeps of:

providing a first opening and a second opening to the chamber; and dimensioning the second opening to be smaller than the first opening.

36. A method for manufacturing a sheath for a folding knife as recited in claim 34, wherein the resilient bowed locking tongue including step includes the substeps of:

shaping the resilient bowed locking tongue to include a leading end, a trailing end, an upper surface, and an undersurface;

configuring the leading end to be dimensionally smaller than the trailing end;

forming a shoe monolithically on the leading end; and shaping the resilient bowed locking tongue to include an arch between the leading end and the trailing end.

37. A method for manufacturing a sheath for a folding knife as recited in claim 34, wherein the disk configuring step includes the substeps of:

shaping the disk to have an anterior side, a posterior side, and a wall therebetween;

installing one or more pegs on the anterior side of the disk; and forming a hole substantially in the middle of the disk for insertion of a screw.

38. A method for manufacturing a sheath for a folding knife as recited in claim 34, wherein the securing means furnishing step includes the substep of providing a metal clamp engagable with a belt of a user of the system.

39. A method for manufacturing a sheath for a folding knife as recited in claim 34, wherein the sheath providing step includes the substeps of;

shaping the sheath to have a proximal end and a distal end; and forming at least two rails within the sheath between the proximal end and the distal end.

40. A method for manufacturing a sheath for a folding knife as recited in claim 39, wherein the zero position disposing means includes he substeps of:

forming a groove in the disk that extends through the wall;

including a plug at the distal end of the sheath;

shaping a slot in the plug;

providing an elastic O-ring demountably positionable in the groove and the slot;

equipping the sheath with a block formed with an inner plate, and outer plate, and a border between the inner plate and outer plate; and forming in the outer plate one or more apertures engagable with the one or more pegs.

* * * * *